United States Patent
Basmaci et al.

(10) Patent No.: US 12,504,746 B2
(45) Date of Patent: Dec. 23, 2025

(54) MACHINE AND METHOD FOR MANUFACTURING A WORKPIECE BY A COMPUTER-CONTROLLED MANUFACTURING MACHINE WITH AN OPTIMAL TOOL CONFIGURATION

(71) Applicant: Siemens Aktiengesellschaft, Munich (DE)

(72) Inventors: Mert Basmaci, Kagithane Istanbul (AR); Muhammet Oguz Ozcan, Sariyer Istanbul (AR); Nesrin Yesilkaya, Kurtkoy Istanbul (AR)

(73) Assignee: Siemens Aktiengesellschaft, Munich (DE)

( * ) Notice: Subject to any disclaimer, the term of this patent is extended or adjusted under 35 U.S.C. 154(b) by 561 days.

(21) Appl. No.: 18/011,347

(22) PCT Filed: Jun. 23, 2021

(86) PCT No.: PCT/EP2021/067235
§ 371 (c)(1),
(2) Date: Dec. 19, 2022

(87) PCT Pub. No.: WO2021/260059
PCT Pub. Date: Dec. 30, 2021

(65) Prior Publication Data
US 2023/0305540 A1    Sep. 28, 2023

(30) Foreign Application Priority Data
Jun. 24, 2020   (EP) .................................... 20181952

(51) Int. Cl.
*G05B 19/418*    (2006.01)

(52) U.S. Cl.
CPC .............. *G05B 19/4187* (2013.01); *G05B 2219/32276* (2013.01); *G05B 2219/32304* (2013.01);
(Continued)

(58) Field of Classification Search
CPC .......... G05B 19/41815; G05B 19/4187; G05B 2219/32276; G05B 2219/32304;
(Continued)

(56) References Cited

U.S. PATENT DOCUMENTS

| | | | |
|---|---|---|---|
| 12,190,262 B2 | 1/2025 | Baier et al. | |
| 12,265,371 B2 * | 4/2025 | Baier | G05B 19/40938 |

(Continued)

FOREIGN PATENT DOCUMENTS

| | | |
|---|---|---|
| CN | 101533274 | 9/2009 |
| CN | 103092132 | 5/2013 |

(Continued)

OTHER PUBLICATIONS

PCT International Search Report and Written Opinion of International Searching Authority mailed Oct. 14, 2021 corresponding to PCT International Application No. PCT/EP2021/067235 filed Jun. 23, 2021.

(Continued)

*Primary Examiner* — Scott T Baderman
*Assistant Examiner* — Mario M Velez-Lopez
(74) *Attorney, Agent, or Firm* — Cozen O'Connor

(57) ABSTRACT

Method for manufacturing a workpiece with a predefined sequence of machine tools by a computer-controlled manufacturing machine with an optimal tool configuration, wherein the initial locations of the tools are allocated, first and second time transfer time functions are calculated for all tools, possible tool location sequences are generated, for possible tool location sequences a respective first cost factor (Continued)

is calculated, obtained tool location sequences are ranked in accordance with the respective first cost factor, the tools are transferred from their initial locations to the optimal locations in accordance with an optimal tool configuration, and the workpiece is manufactured with the optimal tool configuration by the manufacturing machine.

9 Claims, 2 Drawing Sheets

(52) U.S. Cl.
CPC ............. *G05B 2219/32333* (2013.01); *G05B 2219/36361* (2013.01)

(58) Field of Classification Search
CPC ........... G05B 2219/32333; G05B 2219/36361; G05B 2219/36364; Y02P 90/02
See application file for complete search history.

(56) References Cited

U.S. PATENT DOCUMENTS

| | | | | |
|---|---|---|---|---|
| 2001/0041649 A1* | 11/2001 | Susnjara | ................ | B23Q 1/012 483/8 |
| 2014/0371042 A1* | 12/2014 | Bernhard | ........... | B23Q 3/15539 483/1 |
| 2015/0248128 A1* | 9/2015 | Davis | ................ | B23Q 3/15533 700/173 |
| 2021/0268617 A1* | 9/2021 | Baier | ..................... | G06Q 50/04 |
| 2022/0147024 A1* | 5/2022 | Baier | ................. | G05B 19/4187 |
| 2024/0075513 A1* | 3/2024 | Benchieb | ............... | B21D 43/05 |

FOREIGN PATENT DOCUMENTS

| | | |
|---|---|---|
| CN | 109240202 | 1/2019 |
| CN | 110757216 | 2/2020 |
| DE | 102014004654 | * 10/2014 |
| KR | 20190090462 | 8/2019 |
| WO | 2020057713 | 3/2020 |

OTHER PUBLICATIONS

Ghosh, Diptesh: "Comparing genetic algorithm crossover and mutation operators for the indexing problem"; Mar. 1, 2016 (Mar. 1, 2016), XP055841956.

Calmels, Dorothea:; "The job sequencing and tool switching problem: state-of-the-art literature review, classification, and trends"; International Journal of Production Research.; vol. 57; No. 15-16; pp. 5005-5025; XP055758116; ISSN: 0020-7543; DOI: 10.1080/00207543.2018.1505057 / Aug. 6, 2018.

Dang, Quang-Vinh et al: "A matheuristic for parallel machine scheduling with tool replacements"; European Journal of Operational Research, Elsevier, Amsterdam, NL; vol. 291, No. 2, Oct. 6, 2020 (Oct. 6, 2020}, pp. 640-660, XP086466014.

Akturk, Selim et al: "Scheduling with tool changes to minimize total completion time under controllable machining conditions"; Computers and Operations Research, Oxford, GB; vol. 34, No. 7, Dec. 9, 2006 (Dec. 9, 2006), pp. 2130-2146, XP005882424.

* cited by examiner

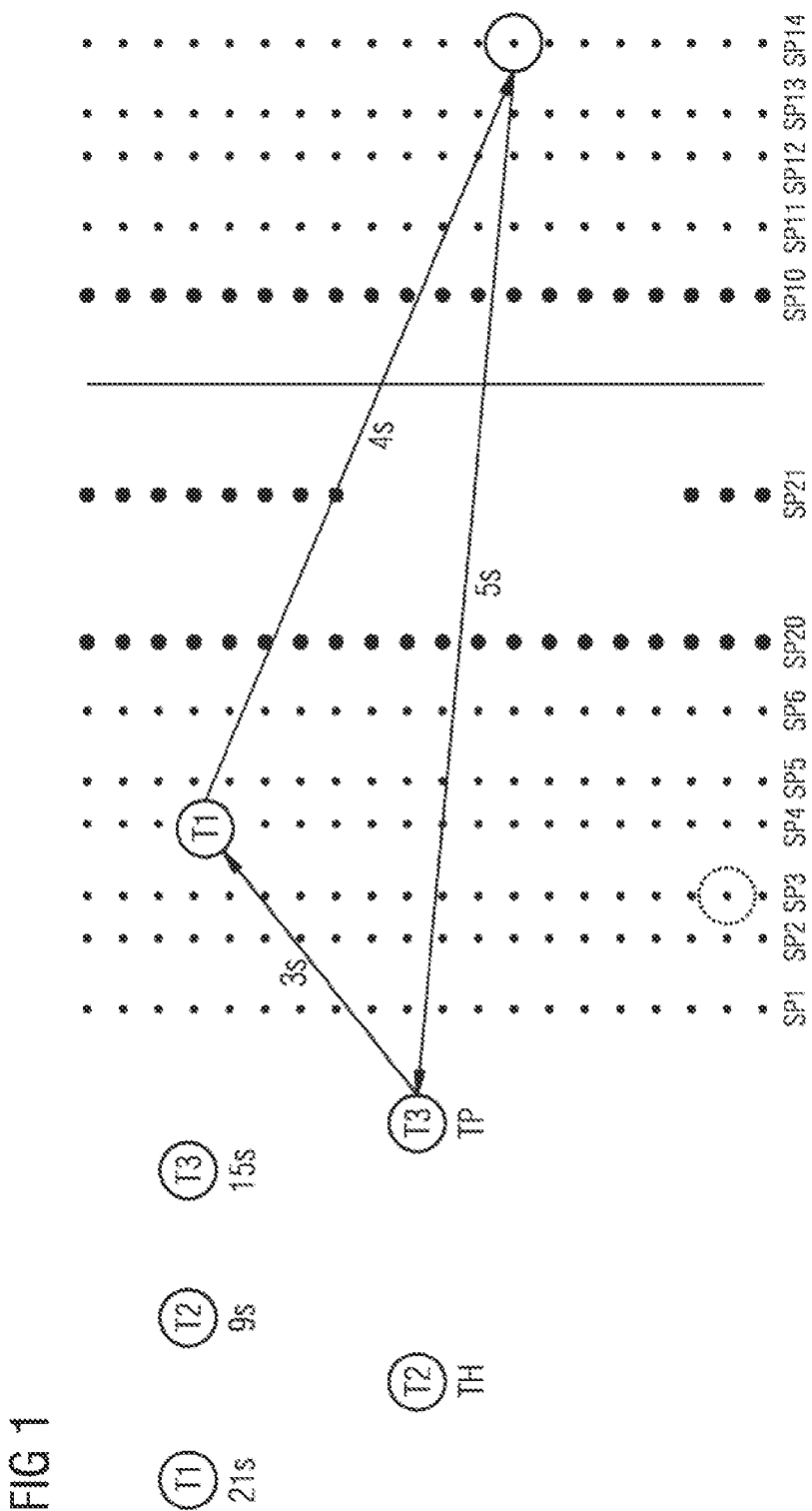

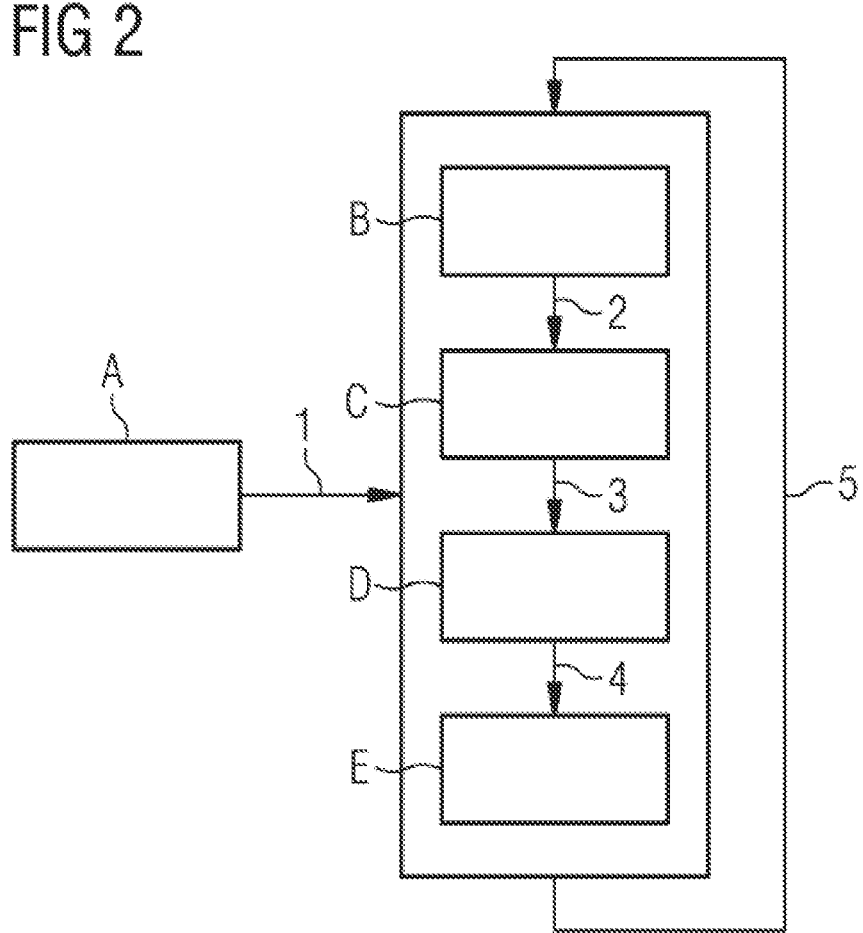

MACHINE AND METHOD FOR MANUFACTURING A WORKPIECE BY A COMPUTER-CONTROLLED MANUFACTURING MACHINE WITH AN OPTIMAL TOOL CONFIGURATION

CROSS-REFERENCE TO RELATED APPLICATIONS

This is a U.S. national stage of application No. PCT/EP2021/067235 filed 23 Jun. 2021. Priority is claimed on European Application No. 20181952.1 filed 24 Jun. 2020, the content of which is incorporated herein by reference in its entirety.

BACKGROUND OF THE INVENTION

1. Field of the Invention

The invention relates to a method for manufacturing a workpiece with a predefined sequence of machine tools by a computer-controlled manufacturing machine with an optimal tool configuration.

2. Description of the Related Art

The "Tool Indexing Problem" (TIP) for Computer Numeric Control (CNC) machines arises in manufacturing due to highly-complex cutting operations and the need for optimal placement of tools in the magazine slots.

The sequence of machine tools defines the manufacturing procedure of the workpiece.

The solution of TIP causes a new problem of how tools can be transferred from their initial locations, i.e., positions, to the optimized locations such that the sum of all transfer times is minimized, which can be named as a "Tool Replacement Problem" (TRP).

The foregoing are very complex and time-consuming tasks, especially for big magazines, which contains many tools. To have a complete optimization in the whole manufacturing process both problems should be considered together. In fact, in cases where tool replacement takes more time than the gain obtained by tool place indexing optimization, cannot be considered as an improvement.

SUMMARY OF THE INVENTION

It is the objective of the invention to solve the provide a method that solves the above-described "Tool Replacement Problem" such that it can be executed of edge devices, i.e., computing devices with limited calculation capabilities.

This and other object and advantages are achieved in accordance with the invention by a method as mentioned before, where the tools are located at respective locations set by the tool configuration, and which are assigned to respective, precalculated operation times, and the machine has a tool transfer point and a tool handler for moving a selected tool from the respective location to the transfer point, and where the following are executed:
  a) Allocating the initial locations of the tools, and calculating for all tools
    a1) a first transfer time function, returning the time between the respective location and the transfer point,
    a2) a second transfer time function, returning the time of a tool handler movement without moving a tool,
  b) Generating possible tool location sequences as a random set of tool location sequences,
  c) Calculating for possible tool location sequences a respective first cost factor using a first cost function using the first transfer time function and second transfer time function,
  d) Ranking of tool location sequences obtained in step c) according to the respective first cost factor, and using a subset of the tool location sequences with the lowest first cost factor as a selected set of tool location sequences, and exploring new tool location sequences based on the selected set of tool location sequences and add the new tool location sequences to the selected set of tool location sequences,
  continuing with step c) to calculate the cost function and perform the ranking and selection and exploration until a predefined parameter for the number of iterations is reached,
  define the selected set of tool location sequences with the lowest cost function as the optimal tool configuration,
  e) transferring the tools from their initial locations to the optimal locations according to the optimal tool configuration, and
  f) manufacturing the workpiece with the optimal tool configuration by the manufacturing machine.

Thus, it is achieved that the optimal tool location sequence considers the initial tool arrangement as well as the tool movements of the tool handler and consequently, an overall optimized tool location sequence, or sequence of tool positions, in applied to the manufacturing of the workpiece.

In the context of the present invention the machine tools relate to the tools used at a single computer-controlled manufacturing machine. Besides the tool indexing problem, replacing tools from their initial locations to optimal locations is another problem and takes a lot of time. Solving these two problems jointly will lead to higher time savings than solving them individually. Having optimal tool places will reduce the running time of NC Program (in fact the manufacturing time for workpieces) by decreasing the waiting time in the spindle. Moreover, those tools will be transferred to their optimal locations in an optimal way.

It is clear, that the optimal sequence becomes more relevant in the context of the invention when the number of used tools is increasing. In particular, the invention can play off its advantages if the number of used tools is at least three or five, preferably at least ten or twenty, more preferably at least fifty or hundred or more.

The invention solves these problems in a remarkably short time and needs less memory compared to brute force approaches, and is therefore more convenient for huge box magazines that contain hundreds of tools.

The invention can save time and enhance productivity compared to brute force approaches or studies in the literature that do not consider TRP with TIP jointly.

Further, there is no need for payment to 3rd party libraries. Moreover, this solution does not require the OSS clearing.

At a glance, the invention is suitable for software platforms with limited computing capabilities, such as edge devices.

The invention starts with an arbitrary set of tool location sequences and develops improved new tool location sequences in order to find a tool location sequence with a relatively optional cost factor.

The result is not an absolute optimal solution, but allows the computation of a very good solution, but with significantly reduced costs.

The exploration of new tool location sequences is advantageous because new assessments of tool location sequences can be performed based of tool location sequences, which are already identified as good tool location sequences with a low fitness function value. Consequently, it is foreseen, that two selected tools sequences are combined such that a new sequence is obtained with parts from selected sequences. There is a high probability that such combinations also provide a good new sequence with a low fitness function value.

In a further embodiment of the invention, the first cost function is defined in accordance with to the following relationship:

$$C = \sum_{i=2}^{N}(o_i + \max(0, MT_i - o_i))$$

with $$MT_i = G(t_{i-1}, v(t_{i-1})) + R(v(t_{i-1}), v(t_{i+1})) + G(t_{i+1}, v(t_{i+1}))$$

where
C is the first cost function,
G is the first transfer time function,
R is the second transfer time function,
O is the operation time function, and
MT is the moving time of tool changing device.

The first cost function allows a simple calculation of a fitness function, which can be used to assess the performance of a dedicated tool location sequence. However, other fitness functions are applicable for the assessment of the cost for accessing a tool.

In a further embodiment of the invention, a respective second cost factor is calculated for the selected set using a second cost function, considering further the time required for the reallocation of tools, using the first cost factor, and further a reallocation factor regarding the impact of a single manufacturing step including the reallocation time on the optimization or alternatively a count factor regarding the impact of the number of occurrences of a single manufacturing step on the overall manufacturing.

This aspect allows further improvement of the calculation of the applied cost function related to specific embodiments, like the incorporation of a relocation factor related to specific tool which are expensive to change, or a count factor related to the number of produced workpieces.

In a further embodiment of the invention, the second cost function is defined in accordance with the following relationship:

$$CP_1 = C + (\alpha \times RT)$$

with $$RT = \sum_{j=1}^{X} R(v(tr_j), vt(tr_j))$$

where
$CP_1$ is the second cost function Type 1 (relocation factor),
$\alpha$ is the reallocation factor,
R is the reallocation time, and
RT . . . is the total reallocation time.

This aspect allows the cost function to be improved by incorporating a relocation factor related to specific tool that are expensive to change, and thus, which, e.g., should not be considered within the optimization procedure at all or at least with a low priority, i.e., weight.

In a further embodiment of the invention, the second cost function is defined in accordance with the following relationship:

$$CP_2 = (C \times p) + RT$$

with $$RT = \sum_{j=1}^{X} R(v(tr_j), vt(tr_j))$$

where
$CP_2$ is the second cost function Type 2 (count factor),
p is the count factor,
R is the reallocation time, and
RT total reallocation time.

This aspect allows the cost function to be improved by incorporating a count factor related to the number of produced workpieces that has a high impact on the optimization procedure when repeated frequently.

In a further embodiment of the invention, the exploration of new tool location sequences includes the application of a genetic crossover function, where two tool location sequences from the selected set are combined into a new tool location sequence. Genetic crossover is described further below.

Thus, the exploration of new tool location sequences can be performed in an easy way by combining already identified good tool location sequences with a low value of the cost factor.

In a further embodiment of the invention, the exploration of new tool location sequences includes the application of a mutation function, where tool locations within a tool location sequence from the selected set is exchanges, preferably randomly exchanged.

Thus, the exploration of new tool location sequences can be performed in an easy way by mutations, which is described further below.

Crossover functions are known in the art but applying an ordered crossover function can lead, in the context of the invention, to an improved selection of the candidate for the optimal tool location sequence.

In genetic algorithms (GA) and evolutionary computation, crossover (also called recombination) is a genetic operator used to combine the genetic information of two parents to generate new offspring. It is one way to stochastically generate new solutions from an existing population, and analogous to the crossover that happens during sexual reproduction in biology.

In some genetic algorithms, not all possible chromosomes represent valid solutions. In some cases, it is possible to use specialized crossover and mutation operators that are designed to avoid violating the constraints of the problem.

It is also an object of the invention to provide a computer-controlled manufacturing machine with machine tools, comprising a control device with a memory for determining an optimal sequence of the tools for manufacturing a workpiece, where the tools are located at respective locations and which are assigned to respective, precalculated operation times, and the machine has a tool transfer point and a tool handler for moving a selected tool from the respective location to the transfer point, and where the control device is configured to execute the method according to the invention.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below with reference to an embodiment shown in the accompanying drawings, in which:

FIG. 1 an exemplary illustration of a tool handling sketch at a Computer Numeric Control (CNC) machine during machining; and FIG. 2 is an embodiment of the method in accordance with the invention.

DETAILED DESCRIPTION OF THE EXEMPLARY EMBODIMENTS

The total production time for machining a workpiece in Computer Numeric Control (CNC) machines considers two parts:
i) a machining time when a tool is machining material, line cutting or drilling, and
ii) a non-machining time when a robot arm is moving on a magazine to retrieve a succeeding tool or the tools are being switched by a gripper in the magazine.

The machining of a workpiece is performed with a specified sequence of tools and any tool can be used several times in this sequence.

While machining the workpiece, the preceding tool should be returned to its corresponding location. Then the robot arm should move to the location of the succeeding tool and eventually bring it to the tool transfer point, from which a selected tool is picked up by a tool holder, e.g., a spindle, of the machine, where the tool is operated.

Therefore, this is a three-step process to retrieve the succeeding tool for the next operation.

During this process, if the current tool operation finishes before the next tool is retrieved to the transfer point, then an idle time occurs in the spindle.

This idle time is called a waiting time, and no machining can be performed during this period.

To increase productivity the waiting time should be minimized as much as possible.

This problem is referred to as TIP and the solution requires consideration of the tool reallocation problem, TRP, together as mentioned before.

These problems are kind of combinatorial optimization problems and can be formulated as a generalized "Traveling Salesman Problem" (TSP), where cities in the TSP correspond to tools in the TIP and distances in the TSP correspond to transfer times of tools in the TIP.

While the cost function of the TSP minimizes the total distance traversed by the salesman, the TIP minimizes the total production time.

The main difference is that, while the city locations are fixed and the optimal solution path is sought in TSP, the tool location sequence is known, and optimal tool place indices are sought in the TIP.

Despite their differences, the main idea is the same in both problems, i.e., they both seek solutions to find optimal traversing times either by changing city paths or by changing tool places.

In the following sections, the constraints of these problems and their formulations are explained, and proposed a genetic algorithm (GA) implementation, steps are given in detail.

Constraints

Working with CNC machines and magazines brings some constraints that are conditions of the optimization problem by their nature, and they should also be satisfied in the solution and the formulation. In the present case, the following constraints are defined:

Each tool should be located at different locations. There should not be any duplicate place in the result set.

Each tool has a size to the left and size to the right parameters, which are defined in half locations. Usually, these sizes are one, which is the minimum value. For bigger tools that cannot fit into one tool place, these values will be bigger than one. The bigger tools occupy half locations of the neighboring places and no tool can be located on the overlapped places.

The magazine places can be enabled or disabled by the machine operators. No tool can be located at the disable locations.

There are two types of tools that can exist in the magazine, which is "heavy" and "light" tools. As their name implies, the distinction is implemented based on the weight of the tools. The tool weight affects the time of the tool movement on the tool magazine. Time for returning a tool from the transfer point to a location and time to fetch a tool from a location to the transfer point varies according to tool weight.

Problem Formulation

The problem is defined as follows:

List of tools $T=t_1, t_2, \ldots, t_N$, which are ordered in accordance with occurrences of the manufacturing process, List of magazine places $P=p_1, p_2, \ldots, p_M$, where $M>N$, Location function $v(t_i)$, which returns magazine place of tool $t_i$, Operation times of each tool $O=o_1, o_2, \ldots, o_N$, which are precalculated running the NC program once, Transfer time function $G(t_i, p_m)$ which returns transferring time of tool $t_i$ from one magazine location $p_m$ to transfer point (robot arm) or vice versa from transfer point (robot arm) to one magazine location $p_m$, Transfer time function $R(p_m, p_m)$ that returns transferring time of an empty robot arm from one magazine location $p_m$ to another magazine location $p_n$, Where the aim is to allocate appropriate locations for tools such that the total execution time of the NC program is minimum. The problem can be formulated as follows:

Find locations of tools, V, which minimizes the cost function:

$$C = \sum_{i=2}^{N}(o_i + \max(0, MT_i - o_i))$$

Where $$MT_i = G(t_{i-1}, v(t_{i-1})) + R(v(t_{i-1}), v(t_{i+1})) + G(t_{i+1}, v(t_{i+1}))$$

represents the moving time of the robot arm, which includes:

Transference time of the previous tool that has finished its cutting from transfer point to its old place.

Transference time of the empty robot arm from the place of the previous tool to the place of the next tool that will be retrieved.

Transference time of the next tool from its place to the transfer point.

And the part max $(0, MT_i\text{-}o_i)$ represents the waiting time of the $t_i$, in case retrieval of the next tool $t_i+1$ takes longer than the operation time of current tool $t_i$.

The tool location sequence is predefined by a manufacturing process by the list of tools $T=t_1, t_2, \ldots, t_N$. The tools are arranged at locations represented by the location function $v(t_i)$, which is the objective of the invention.

FIG. 1 shows an exemplary tool movement at a CNC machine.

Here, spindle magazines SP1-SP6, SP10-SP14 and SP20-SP21 with predefined locations can be seen.

Three tools exist in this scenario, they are:
i) tool T1, which is the previously used tool and it should be returned to its previous location,
ii) tool T2, which is in the tool holder TH, i.e., the spindle and currently cutting a piece, and
iii) tool T3, which is the next tool that will be used and should be retrieved to the transfer point TP.

In FIG. 1, the numbers below the tools T1, T2, T3 indicate the respective operation times $O_{T1}, O_{T2}, O_{T3}$ in seconds. For this example, the operation time $o_{T2}$ of tool T2 is 9s,
the returning time of preceding tool G $(t_{T1}, v(t_{T1}))$, the so-called first transfer time function, is 3s,
the empty movement time from preceding tool location to the succeeding tool location $R(v(t_{T1}), v(t_{T3}))$, the so-called second transfer time function, is 4s, and
the pick-up time of succeeding tool to the transfer point $G(t_{T3}, v(t_{T3}))$ is 5s.

The waiting time for this example is 3s by $$\max(0, [(G(t_{T1}, v(t_{T1})) + R(v(t_{T1}), v(tr)) + G(t_{T3}, v(t_{T3})) - o_{T2}]).$$

TRP Joined TIP

The second problem is the TRP and it is jointly solved with the TIP.

Transferring tools from their initial locations to optimal index locations requires a significant amount of time in some cases, especially if the result contains a massive number of tool reallocations or contains long tool traveling distances.

Therefore, in such cases, instead of having a most optimal solution that requires many transferring times, having a slightly less optimal solution with less tool transferring time might be superior in terms of productivity.

This is an important part of the entire optimization.

The concept foresees addition of the time required for the reallocation of tools to the cost function of GA and adapt the algorithm.

Secondly, the number of manufactured pieced is also important, while considering the TRP from a profitability perspective.

Previously, it was said that the main goal is to reduce the waiting time in the spindle and increase productivity with extended GA solutions.

The resultant target allocation may cause the following case: Some tools must first be transported away from their original magazine location before any other tool can be placed in this location.

The question arises on how the initial tool allocation can be transferred to the target allocation such that the sum of all transfer times is minimized.

Therefore, besides the minimization of waiting times, the reallocation time of the tools is also considered in this problem in two perspectives:

I. The first one is the effect of a reallocation factor a on optimization results. In order to investigate the effect of the reallocation factor, the cost function as defined above as C is extended following:
a list of tools to be placed in a target location that differs from initial location $Tr=tr_1, tr_2, \ldots, tr_x$,
a target location function $vt(tr_j)$, which returns target location for tool $tr_j$,
the reallocation factor a is in the range between 0 and 1, allowing to reformulate the cost function:

$$CP_1 = C + (\alpha \times RT)$$

where $$RT = \sum_{j=1}^{X} R(v(tr_j), vt(tr_j))$$

represents total reallocation time RT for a solution.

In other words, the relocation factor is a representation whether a relocation of a tool from a first location to a second location is expensive, e.g., time consuming. Consequently, such a tool relocation should be avoided, which is expressed by a respective high weight of the relocation factor at the optimization process.

The relocation factor is a weight value between zero and one.

II. The second one is the productivity perspective. The estimated count for NC Program execution is taken as a parameter to the GA solution and, in accordance with this run count, the most optimized solution is provided as a result.

In order to consider reallocation time over productivity, the cost function as defined above is extended, with p as the estimated count factor for NC Program execution, as following:

$$CP_2 = (C \times p) + RT$$

In other words, the count factor is a representation of whether a tool is often used within a predefined manufacturing sequence. Consequently, the weight of the dedicated manufacturing step is high if often used, i.e., the weight within the optimization procedure is important and the respective count factor value is also high.

The count factor is a weight value between zero and one.

GA Steps

GA is a type of metaheuristic algorithms and has proved that it is very effective in optimization problems.

The GA implementation includes five main steps:
1. Random initial population creation: The very first step of the GA is to start with randomly generated chromosomes. The number of the initial population is defined by the "initial population" hyperparameter. The created solutions are composed of tool location sequences, which are called "genes". The length of the solution is defined by the number of tools used in the NC program used for the cutting.
2. Ranking the solutions: The ranking is the second step of the GA method. It is done based on the "fitness" function, whose details will be provided below. The solutions with less cutting time in total are ranked before the others.
3. Selection: The third step of the GA is to select the solutions for the next generation and for the mutation.

Solutions with low fitness function scores are eliminated in this step. Elite chromosomes/solutions are always carried to the next generation without any modification or mutation. The size of the elite ones is determined by another hyperparameter called "elite size". The selection methodology used here is "Fitness proportionate selection" also known as "roulette wheel selection". This selection method aims to select potentially useful solutions for the next generations. After the elites are directly carried to the next generation, other solutions are selected by giving chance proportional to their fitness score and carried to the next generation after crossover and mutation. Therefore, the solution having a lower cost (i.e., the better solution) has a better chance of being selected with this selection method.

4. After the selection, the next step is to apply crossover, where different options for this are applicable. Ordered Crossover (OX) outperforms the other crossover techniques known in the art, because it selects more uniformly distributed genes over parents.

5. Mutation: The last step is the mutation of the found solutions. "mutation rate" hyperparameter is used here to decide whether to mutate the current solution or not.

6. The above process is repeated as a predefined "generation count" hyperparameter.

In genetic algorithms and evolutionary computation, crossover, also called recombination, is a genetic operator used to combine the genetic information of two parents to generate new offspring. It is one way to stochastically generate new solutions from an existing population and is analogous to the crossover that happens during sexual reproduction in biology.

Solutions can also be generated by cloning an existing solution, which is analogous to asexual reproduction. Newly generated solutions are typically mutated before being added to the population.

A mutation in the context of the present invention designates a change of a tool location within a tool location sequence used within the optimization procedure.

FIG. 2 shows an embodiment of the method in accordance with the invention.

The GA method starts with generating in step A "initialPopulation ( )" of a randomized initial set 1 of possible solutions.

Each solution is represented using a "gene".

Next, in step B "rankPossibleSolutions ( )", the solutions are ranked according to the "fitness" function as ranked, i.e., sorted population data 2.

At this stage, in step C "selection ( )", using specialized selection methods, solutions of low fitness are eliminated, and selected individuals 3 are further processed.

The next-generation solutions are developed by a process in step D "treedPopulation ( )", which mimics mutation and mating in natural selection and result in a new population with children and elites 4.

The cycle is accordingly repeated for the next, mutated population 5, performed at step E, until a predefined termination criterion is achieved.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for manufacturing a workpiece with a predefined sequence of machine tools by a computer-controlled manufacturing machine with an optimal tool configuration, said machine tools being located at respective locations set by the optimal tool configuration and being assigned to respective, precalculated operation times, and a machine including a tool transfer point and a tool handler for moving a selected tool from a respective location of the respective locations to the transfer point, the method comprising:

a) allocating initial locations of the machine tools, and calculating for all tools i) a first transfer time function, returning a time between the respective location and the transfer point, and ii) a second transfer time function, returning a time of a tool handler movement without moving a tool;

b) generating possible tool location sequences as a random set of tool location sequences;

c) calculating a respective first cost factor for possible tool location sequences utilizing a first cost function utilizing the first and second transfer time functions;

d) ranking tool location sequences obtained in step c) in accordance with the respective first cost factor, a subset of the tool location sequences with a lowest first cost factor being utilized as a selected set of tool location sequences, new tool location sequences being explored based on the selected set of tool location sequences and the new tool location sequences being added to the selected set of tool location sequences, and step c) being continue to calculate the cost function and perform the ranking and selection and exploration until a predefined parameter for the number of iterations is reached, define the selected set of tool location sequences with the lowest cost function being defined as the optimal tool configuration;

e) transferring the machine tools from their initial locations to the optimal locations in accordance with the optimal tool configuration;

f) manufacturing the workpiece with the optimal tool configuration by the manufacturing machine.

2. Method according to claim 1, wherein the first cost function is defined in accordance with the following relationship:

$$C = \sum_{i=2}^{N} (o_i + \max(0, MT_i - o_i))$$

with $$MT_i = G(t_{i-1}, v(t_{i-1})) + R(v(t_{i-1}), v(t_{i+1})) + G(t_{i+1}, v(t_{i+1}))$$

where
C is the first cost function,
G is the first transfer time function,
R is the second transfer time function,
O is the operation time function, and
MT is the moving time of tool changing device.

3. The method according to claim 1, wherein a respective second cost factor is calculated for the selected set utilizing a second cost function, considering further a time required for the reallocation of tools, utilizing the first cost factor, and further a reallocation factor regarding an impact of a single manufacturing step including a reallocation time on an optimization or alternatively a count factor regarding an impact of the number of occurrences of a single manufacturing step on an overall manufacturing process.

4. The method according to claim 3, wherein the second cost function is defined in accordance with the following relationship:

$$CP_1 = C + (\alpha \times RT)$$

with $$RT = \sum_{j=1}^{X} R(v(tr_j), vt(tr_j))$$

where
$CP_1$ is the second cost function Type 1,
R is the reallocation time, and
RT is the total reallocation time.

5. The method according to claim 3, wherein the second cost function is defined in accordance with the following relationship:

$$CP_2 = (C \times p) + RT$$

with $$RT = \sum_{j=1}^{X} R(v(tr_j), vt(tr_j))$$

where
$CP_2$ is the second cost function Type 2,
R is the reallocation time, and
RT is the total reallocation time.

6. The method according to claim 1, wherein the exploration of new tool location sequences includes the application of a genetic crossover function; and wherein two tool location sequences from the selected set are combined into a new tool location sequence.

7. The method according to claim 1, wherein the exploration of new tool location sequences includes an application of a mutation function; and wherein tool locations within a tool location sequence from the selected set are exchanged, preferably randomly exchanged.

8. The method according to claim 7, wherein tool locations within a tool location sequence from the selected set are randomly exchanged.

9. A computer-controlled manufacturing machine with machine tools, comprising:
a control device including memory for determining an optimal sequence of the machine tools for manufacturing a workpiece, the machine tools being located at respective locations and the machine tools being assigned to respective, precalculated operation times;
wherein the machine includes a tool transfer point and a tool handler for moving a selected tool from a respective location of the respective locations to the transfer point;
wherein the control device is configured to:
a) allocate initial locations of the machine tools, and calculate for all tools i) a first transfer time function, returning a time between the respective location and the transfer point, and ii) a second transfer time function, returning a time of a tool handler movement without moving a tool;
b) generate possible tool location sequences as a random set of tool location sequences;
c) calculate a respective first cost factor for possible tool location sequences utilizing a first cost function utilizing the first and second transfer time functions;
d) rank tool location sequences obtained in step c) in accordance with the respective first cost factor, a subset of the tool location sequences with a lowest first cost factor being utilized as a selected set of tool location sequences, new tool location sequences being explored based on the selected set of tool location sequences and the new tool location sequences being added to the selected set of tool location sequences, and step c) being continue to calculate the cost function and perform the ranking and selection and exploration until a predefined parameter for the number of iterations is reached, define the selected set of tool location sequences with the lowest cost function being defined as the optimal tool configuration;
e) transfer the machine tools from their initial locations to the optimal locations in accordance with the optimal tool configuration; and
f) manufacture the workpiece with the optimal tool configuration by the manufacturing machine.

* * * * *